United States Patent [19]

Pfleger et al.

[11] Patent Number: 5,376,739
[45] Date of Patent: Dec. 27, 1994

[54] PREPARATION OF COPOLYMERS OF ETHYLENE WITH ACRYLIC ESTERS

[75] Inventors: Klaus Pfleger; Gerhard Arnold, both of Wesseling; Siegfried Schiller; Herbert Mueller, both of Bruehl, all of Germany

[73] Assignee: BASF Aktiengesellschaft, Ludwigshafen, Germany

[21] Appl. No.: 72,043

[22] Filed: Jun. 7, 1993

[30] Foreign Application Priority Data

Jun. 11, 1992 [DE] Germany ............... 4219129

[51] Int. Cl.$^5$ .................. C08F 2/34; C08F 220/12
[52] U.S. Cl. ............................ 526/64; 526/73; 526/329
[58] Field of Search ................ 526/64, 318.6, 73, 329

[56] References Cited

U.S. PATENT DOCUMENTS 4,087,601  5/1978  Pfleger et al. .............. 526/64

Primary Examiner—Joseph L. Schofer
Assistant Examiner—Tom Weber
Attorney, Agent, or Firm—Keil & Weinkauf

[57] ABSTRACT

A process for preparing copolymers of ethylene with acrylic esters by copolymerizing 100 parts by weight of ethylene with from 0.1 to 25.0 parts by weight of acrylic ester in a continuous tubular polymerization system at from 500 to 4000 bar and from 100° to 400° C. in the presence of free radical polymerization initiators, comprises controlling the temperature for the reaction mixture, comprising ethylene, the acrylic ester, the polymerization initiator and optionally a regulator, after entry into the reaction zone in such a way that the ratio dT/dt (temperature increase per unit time) is kept constant at a value within the range from 1.5° to 2.5° C. per second.

3 Claims, No Drawings

PREPARATION OF COPOLYMERS OF ETHYLENE WITH ACRYLIC ESTERS

The present invention relates to a process for preparing copolymers of ethylene with acrylic esters by copolymerizing 100 parts by weight of ethylene with from 0.1 to 25.0 parts by weight of acrylic ester in a continuous tubular polymerization system at from 500 to 4000 bar and from 100° to 400° C. in the presence of free radical polymerization initiators.

The ethylene-acrylic ester copolymers formed in the above polymerization are used for example as film, sheet, cable insulation and adhesives.

The copolymers are produced in tubular reactors as described for example in Ullmanns Encyclopädie der technischen Chemie, 4th edition, volume 19, pages 173–175.

For the purposes of the present invention ethylene-acrylic ester copolymers are copolymers which have a polymerized comonomer content of from 0.1 to 25.0, preferably 0.5 to 20.0, % by weight, a melt index of from 0.1 to 25 g/10 min, determined in accordance with ASTM-D 1238-65T at 190° C. under a load of 2.16 kg, and a density of from 0.890 to 0.935 g/cm$^3$ as measured by the method of DIN 53479.

The acrylic ester used can be any acrylic ester that is copolymerizable with ethylene at the specified temperatures and pressures. Examples of such comonomers are esters of acrylic and methacrylic acid with $C_1$- to $C_8$-alkanols, preferably $C_1$- to $C_6$-alkanols. Particular preference is given to methyl, n-butyl and tert-butyl acrylate. It is also possible to use mixtures of acrylic esters.

The ethylene is copolymerized with the acrylic ester in the presence of free radical polymerization initiators. For the purposes of the present invention free radical polymerization initiators are those catalysts that are also used for the high pressure homopolymerization of ethylene. One example is oxygen, advantageously employed in amounts of from 2 to 100 mol ppm, based on the ethylene to be polymerized. It is also possible to use peroxides and other free radical formers and also mixtures of peroxides, and mixtures of oxygen and peroxides and/or hydroperoxides.

Examples of peroxides and hydroperoxides are tert-butyl peroxypivalate, di-tert-butyl peroxide, tert-butyl hydroperoxide, tert-butyl perbenzoate, p-menthane hydroperoxide and lauroyl peroxide. The term free radical polymerization initiators shall also encompass compounds such as azobisbutyronitrile. It is also possible to use mixtures of oxygen and one or more peroxides. The preferred initiator for the copolymerization of ethylene with vinyl esters is atmospheric oxygen.

The presence of a polymerization regulator is customary. Polymerization regulators make it possible to regulate the melt index of the ethylene copolymers being formed. Suitable regulators are for example hydrogen, ketones, aldehydes, alcohols, ethers and normal or branched hydrocarbons. Preference is given to using propane, propylene, methyl ethyl ketone or propionaldehyde. The polymerization regulator is in general used in an amount of from 0.2 to 5 mol %, based on the ethylene to be polymerized. In a particular embodiment of the process, no additional polymerization regulator is used when the comonomers used themselves have regulator properties or when the copolymerization gives rise to substances that have regulator properties.

The copolymerization is in general carried out in the absence of a solvent. The small amounts of an inert solvent, such as benzene, mineral oil or other inert solvents, in which the peroxide used as the polymerization initiator is dissolved do not count compared to the other starting materials. If oxygen is used as polymerization initiator, no solvent will be present at all.

The production of the above-described copolymers is known and has been described in the patent literature.

In French Patent 1,596,991 the preparation of copolymers of ethylene with acrylic esters is carried out at a reactor temperature sufficiently high for the secondary and tertiary ester groups in the polymer to become partly or wholly pyrolyzed, eliminating an alkene to leave free carboxyl groups in the copolymer.

Further processes, for example as described in British Patents 1,010,847, 915,210 and 1,347,361, are directed to increasing the conversion of ethylene to polyethylene per pass.

The known processes are prone, especially in the course of a lengthy run, to develop production problems due to fluctuations in the reaction temperature. Starting at the upstream end of the reaction zone, the temperature fluctuations propagate in pulses throughout the entire reaction zone. At the extreme the instability has been observed to give rise to violent decompositions of the reaction mixture.

It is an object of the present invention to stabilize the copolymerization of ethylene with acrylic ester in tubular reactors in such a way that the problems mentioned are effectively eliminated and decompositions of the reaction mixture are ruled out.

We have found that this object is achieved by controlling the temperature for the reaction mixture, comprising ethylene, the acrylic ester, the polymerization initiator and optionally a regulator, after entry into the reaction zone in such a way that the ratio dT/dt (temperature increase per unit time) is kept constant at a value within the range from 1.5° to 2.5° C. per second.

A preferred value for the ratio of temperature increase per unit time is from 1.6° to 2.3° C. per second.

If n-butyl acrylate is used, the ratio dT/dt should be maintained within the range from 1.6° to 1.9° C. per second. On no account may the upper limit be exceeded, since otherwise the reaction mixture may undergo decomposition within a very short time.

The copolymerization of ethylene with tert-butyl acrylate may be carried out with a somewhat higher increase of the temperature of the reaction mixture on its passage through the first tubes of the reaction zone; in this case the ratio dT/dt can be set to a value within the range from 1.9° to 2.3° C. per second. Preferably, relatively short reactors are operated at the upper end of the specified ranges, since this can result in maximum conversions being obtained.

Longer reactors possess sufficient capacity for converting the reactants, so that for economical operation the reactor need not absolutely be operated at the upper limit of the ratio dT/dt.

On no account, however, may the upper limit be exceeded, since in this case, too, decompositions of the reaction mixture have been observed.

The process is operated at pressures above 800 bar, preferably at a pressure from 1500 to 3000 bar, and at from 150° to 350° C. On entry into the reaction zone the reaction mixture is immediately subjected to a precise temperature control regime in such a way that the ratio dT/dt—temperature increase per unit time for the reaction mixture on its passage through the first ten tubes of the reaction zone—is kept constant at a defined value depending on the composition of the reactants, and an upper limit for the ratio is not exceeded.

Setting the temperature control variable within the first ten tubes of the reaction zone, i.e. over a distance of from 100 to 200 m depending on reactor type, is effected via the amount and temperature of the cooling medium passing through the cooling Jackets of the reaction tubes together with the concentration of polymerization initiator and the gas temperature of the reaction mixture at the entrance to the reaction zone.

The cooling medium employed in a known manner is pressurized water at from 160° to 200° C.

In a preferred embodiment of the process of the invention, the section within which the ratio $dT/dt$ must be kept constant is cooled with a cooling means that is separate from the general hot water cooling cycle.

The gas temperature of the reaction mixture at the entrance to the reaction zone is limited to a maximum of 175° C.

The process of the invention was surprisingly found to give a significantly more stable reactor performance.

However, without precisely defined temperature control of the reaction mixture in the first tubes of the reaction zone, the copolymerization of ethylene with n-butyl acrylate gives temperature fluctuations of up to 50° C. and with tert-butyl acrylate of from 10° to 20° C.

These relatively large temperature fluctuations can be ascribed to a hot spot reaction between acrylic ester molecules. The acrylic esters react many times faster than the ethylene; the products are primarily polyacrylates which form stubborn coatings on the surfaces of the reaction tubes. This leads to a deterioration in the heat transfer, as a result of which the instability of the reaction, and the temperature fluctuations, increase still further. At a certain thickness of the wall deposit the heat transfer deteriorates to such an extent that decompositions of the reaction mixture occur.

The process of the invention is free of the disturbances mentioned; surprisingly, if temperature fluctuations still occur anywhere in the reaction zone, they are only small. No decompositions were observed when the conditions set out in the claims were maintained.

EXAMPLE 1

A mixture of 1000 parts by weight of ethylene, 32 parts by weight of n-butyl acrylate and 15 mol ppm of oxygen, based on ethylene, and also 0.3 part by weight of propylene as polymerization regulator was copolymerized at 2300 bar in a tubular reactor.

The mixture was introduced into the reaction zone at 171° C.

The rate of temperature rise in the first ten tubes of the reaction zone was kept constant at 1.8° C./s.

The cooling medium (hot water) pumped in countercurrent through the cooling jackets of the reaction tubes had an inlet temperature of 172° C. The flow rate of the hot water was 7.4 m$^3$ per hour for the cooling section in question.

The reaction mixture attained its maximum temperature of 270° C. in the second half of the reaction zone.

The temperature throughout the entire reaction zone fluctuated only minimally. No decompositions occurred under the stated reaction conditions.

The product obtained was 217 kg of a homogeneous ethylene-butyl acrylate copolymer possessing good film/sheet properties.

Analyses indicated the following values:

| Melt index | 1.36 ± 0.05 g/10 min. |
|---|---|
| Density | 0.9247 g/cm$^3$ |
| n-Butyl acrylate content | 14.3 ± 0.1% by weight |

EXAMPLE 2

A mixture of 1000 parts by weight of ethylene, 33 parts by weight of tert-butyl acrylate and 10 mol ppm of oxygen, based on ethylene, was copolymerized in a tubular reactor at 2250 bar.

The reaction mixture was introduced into the reaction zone at 167° C.

The rate of temperature rise in the first ten tubes of the reaction zone was kept constant at $dT/dt = 2.25°$ C./s.

The hot water pumped as cooling medium through the cooling Jackets of the reaction tubes had an inlet temperature of 176° C.; the hot water flow rate was 8.3 m$^3$/h for the cooling section in question.

The reaction mixture attained its maximum temperature of 292 C. in the second half of the reaction zone.

Throughout the entire reaction zone there were only minimal fluctuations in the temperature; even after a run of several weeks the reaction was still very stable nor did any decompositions occur under the reaction conditions mentioned.

The product obtained comprises 220 kg of a homogeneous copolymer having good film/sheet properties.

Analyses indicated the following values:

| Melt index | 7.4 ± 0.1 g/10 min. |
|---|---|
| Density | 0.9269 g/cm$^3$ |
| t-Butyl acrylate content | 6.90 ± 0.05% by weight |
| Free acrylic acid content | 4.05–0.05% by weight |

COMPARATIVE EXAMPLE 1

Example 1 was repeated except that the temperature control variable at the entrance to the reaction zone was not kept within a precisely defined range, i.e. the ratio $dT/dt$ of the reaction mixture was not kept constant as the mixture passed through the first ten reaction tubes.

The reaction mixture reached its maximum temperature in the second half of the reaction zone, fluctuating within the range from 255° to 298° C. The precise location of the temperature maximum also varied and decompositions of the reaction mixture occurred.

The 250 kg of copolymer obtained gave the following analytical values:

| Melt index | 1.30–1.36 g/10 min |
|---|---|
| Density | 0.9243 g/cm$^3$ |
| n-Butyl acrylate content | 14.2–14.5% by weight. |

COMPARATIVE EXAMPLE 2

Example 2 was repeated except that the increase in the temperature of the reaction mixture following its entry into the reaction zone was not kept specifically at a constant value.

The reaction mixture attains maximum temperatures of from 280° to 296° C. in the second half of the reaction zone.

Temperature fluctuations were observed throughout the entire reaction zone. There were also changes in the precise location of the temperature maximum and occasionally decompositions of the reaction mixture occurred.

The 225 kg of copolymer obtained gave the following analytical values:

| | |
|---|---|
| Melt index | 7.45–7.60 g/10 min |
| Density | 0.9273 g/cm$^3$ |
| t-Butyl acrylate content | 6.85–7.10% by weight |
| Free acrylic acid content | 4.0–4.1% by weight |

We claim:

1. A process for preparing copolymers of ethylene with acrylic esters by copolymerizing 100 parts by weight of ethylene with from 0.1 to 25.0 parts by weight of acrylic ester in a continuous tubular polymerization system at from 500 to 4000 bar and from 100° to 400° C. in the presence of free radical polymerization initiators, which comprises controlling the temperature for the reaction mixture, comprising ethylene, the acrylic ester, the polymerization initiator and optionally a regulator, after entry into the reaction zone in such a way that the ratio dT/dt (temperature increase per unit time) is kept constant at a value within the range from 1.5° to 2.5° C. per second.

2. A process as claimed in claim 1, wherein if n-butyl acrylate is used the ratio dT/dt is set to a value within the range from 1.6° to 1.9° C. per second and kept constant at that value.

3. A process as claimed in claim 1, wherein if tert-butyl acrylate is used the ratio dT/dt is set to a value within the range from 1.9° to 2.3° C. per second and kept constant at that value.

* * * * *